QUARTZ TO METAL SEAL FOR ELECTRICAL DEVICES

Filed Sept. 26, 1968

Inventors:
Gene I. Thomasson
Edward V. Parillo
by Otto Tichy
Their Attorney 3,515,420

QUARTZ TO METAL SEAL FOR ELECTRICAL DEVICES

Gene I. Thomasson, Chesterland, and Edward V. Parillo, South Euclid, Ohio, assignors to General Electric Company, a corporation of New York Filed Sept. 26, 1968, Ser. No. 762,743
Int. Cl. F16b *11/00*
U.S. Cl. 287—189.365 6 Claims

ABSTRACT OF THE DISCLOSURE

In a seal comprising a member of fused silica or quartz having a lead-in conductor sealed therein and including a thin foil portion of molybdenum and a refractory metal outer lead wire portion connected to the foil portion and extending through the silica member to the exterior thereof with a small longitudinal passage alongside and between the silica member and the portion of the outer lead wire enclosed thereby, a bead of glass of relatively low expansion and softening temperature is sealed around said outer lead wire portion and is completely embedded in the silica member to form a barrier which effectively prevents penetration of air through said passage to said foil which would otherwise result in oxidation of the foil at elevated temperatures.

BACKGROUND OF THE INVENTION

Field of the invention

The invention relates generally to electrical devices such as lamps, and more particularly to seals of metallic lead-in conductors in members or portions of such devices composed of essentially fused silica, including quartz and the material known as 96% silica glass of Vycor.

Description of the prior art

By way of example, the invention will be referred to in connection with quartz electric lamps, especially incandescent lamps which comprise an envelope of quartz having therein a tungsten wire filament which is connected at its ends to lead-in conductors which are hermetically sealed through a single pinch seal portion or through pinch seal portions at respective ends of the lamp, depending upon whether the lamp is of the single-ended or double-ended type. The lead-in conductors each generally comprise outer lead wire portions of refractory metal such as molybdenum connected to extremely thin foil portions of molybdenum which are hermetically sealed in the quartz pinch seal.

Such seals are entirely satisfactory as long as the seal temperature does not exceed about 350° C. At higher temperatures the seal fails due to oxidation of the molybdenum foil by the oxygen in air which has access to the foil through slight capillary passages or crevices which inevitably remain alongside the outer lead wires when the quartz is pinched against the wire. The passages are the result of the low expansion of quartz compared to that of the wire and the high viscosity of fused silica or quartz which prevents it from flowing completely around the lead wire when it is pinched or compressed to form the seal. The quartz also does not make a hermetic seal with the relatively heavy molybdenum lead wire due to the great difference in coefficients of expansion.

Many attempts have been made to achieve that objective, including the application of various types of oxidation-resistant coatings to the lead wire and to the foils. While some success has been achieved, in other cases various metals and combinations which have been proposed for that purpose have relatively low melting points so that they melt during formation of the seal. Furthermore, in some cases such coatings prevent the formation of a hermetic seal with the foil.

It has also been proposed, in Pat. 3,211,826 to R. H. Holcomb and G. I. Thomasson, that the aforesaid capillary passages be blocked by the presence therein of a lead borate glass which has a low melting point such that it is molten at elevated temperatures and thereby forms a liquid seal during operation of the lamp at such high temperatures. Such a construction is especially effective primarily in a seal temperature range above 500° C. However, it is not as fully effective at temperatures between 350° C. and 500° C. because the glass is not yet molten, and due to its greatly different expansion from quartz, it is cracked and thus permits air to penetrate through to the foil.

SUMMARY OF THE INVENTION

It is therefore an object of this invention to provide an improved construction for preventing, or at least effectively retarding, molybdenum foil seal oxidation in pinch seals at elevated temperatures beginning at about 350° C. where molybdenum begins to oxidize.

In accordance with the present invention, the said object is achieved by providing an effective oxygen barrier in the form of a glass bead on each of the outer lead wires, which bead is completely embedded in the quartz pinch and is composed of glass having relatively low expansion which may be about the same as, or not substantially greater than about four times that of the quartz and which has a softening temperatures significantly less than that of the quartz but above about 700° C.

DESCRIPTION OF THE PREFERRED EMBODIMENTS

While the invention may be applied to various devices having sealed envelopes of fused silica or quartz, or other low expansion materials, including electric lamps of the incandescent or gaseous discharge types, it will be described herein in connection with an electric incandescent lamp of the halogen regenerative cycle type which may be generally like that disclosed in Pat. 2,883,571 to E. G. Fridrich et al.

Figure 1:
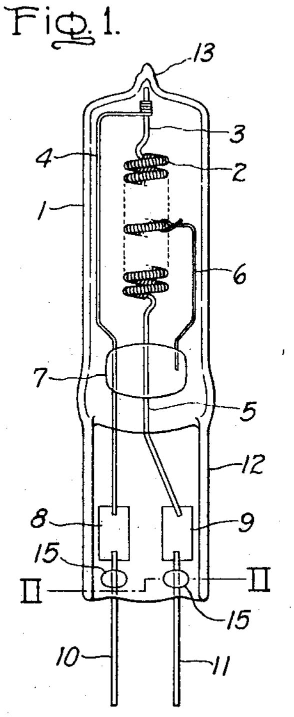
FIG. 1 of the drawing is an elevation view of an incandescent electric lamp incorporating the invention.

Referring to FIG. 1 of the drawing, the lamp comprises a tubular envelope 1 consisting essentially of fused silica or quartz and containing a filament 2 of coiled-coil tungsten wire and a filling of inert gas such as nitrogen, argon, krypton or xenon or mixtures thereof as well as a small amount of halogen such as iodine or bromine or compounds thereof. The filament 2 is supported at its upper end by a tungsten spud wire 3 to which is secured one end of a long inner lead wire 4, and at its lower end the filament is supported by a short inner lead wire 5. The filament 2 is additionally supported at its center by a looped end of a support wire 6 which has its lower end embedded in a quartz bead 7 in which are also embedded portions of the lead wires 4 and 5. The lower ends of the inner lead wires 4 and 5 are welded to very thin molybdenum foils 8 and 9 to which are also welded outer lead wires 10 and 11. The foils 8 and 9 are hermetically sealed, and adjacent portions of inner leads 4 and 5 and outer leads 10 and 11 are embedded in a pinch seal 12 which is formed by compressing or pinching the lower end of envelope 1 which is heated to a plastic condition while an inert or reducing gas is flowed through envelope 1 by way of an exhaust tube at its upper end, the residue of which is seen at 13. The outer leads 10 and 11 are formed of a refractory metal such as molybdenum, tungsten, tantalum, platinum, etc., preferably molybdenum or platinum-clad molybdenum.

Figure 2:
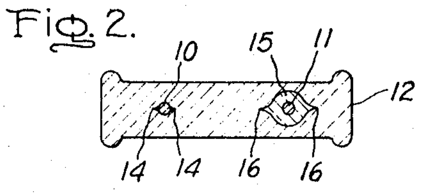
FIG. 2 is a section taken along the line II—II in FIG. 1.

Due to the very high viscosity of softened fused silica or quartz, it does not flow completely around the lead wires but leaves very small capillary passages such as those shown at 14 alongside outer lead wire 10 in FIG. 2. The atmospheric air thus has access to the foils 8 and 9 by way of the passages 14 which results in oxidation of the molybdenum foils should they exceed a temperature above about 350° C. Such temperatures are achieved in some lamps of high wattage, especially when used in confined fixtures without artificial cooling.

In accordance with the invention, each of the outer leads 10 and 11 is provided with a special glass bead 15 prior to insertion and sealing of the filament mount structure into the envelope 1. The glass beads 15 are of a composition such that they seal to the fused silica or quartz pinch seal 12 by virtue of a close expansion match. They soften at a temperature sufficiently lower than quartz that they deform during the pinch sealing and fill what would otherwise be open channels 14 between the leads wires 10 and 11 and the quartz, thus effecting a barrier against the penetration of air into the seal, and they form a sufficiently strong bond to the lead wires 10 and 11 such that in spite of an expansion mismatch with the wire, an effective oxygen barrier is maintained. As seen in FIG. 2, the edges of the glass beads 15 also flow outwardly at their sides to form pointed edges 16 which would otherwise be open channels or voids in the quartz pinch due to the high viscosity of the quartz. Small amounts of glass of the beads 15 also flow short distances, about one millimeter for example, upwardly and downwardly into the passages 14.

Accordingly, the glass of the beads 15 should have a coefficient of expansion which may be about the same as that of fused silica or quartz or not substantially more than about four times greater, that is, not greater than about $23\times10^{-7}/°$ C. and preferably less than $15\times10^{-7}$. The softening point may be within a relatively wide range as long as the thermal expansion requirements are satisfied; the upper limit may be about 1300° C. in order to insure that the viscosity is sufficiently low at sealing temperatures to allow good flow characteristics; and the lower limit should be above about 700° C. in order that the viscosity of the glass during sealing is high enough to prevent it from completely running out of the seal area.

Referring more particularly to the composition of the glass beads 15, by way of example, the above requirements are found in a family of copper-alumino-silicate glasses having a composition, in percent by weight, within the approximate range given in the following table:

TABLE I

| | Percent |
|---|---|
| $SiO_2$ | 33–66 |
| $Al_2O_3$ | 11–28 |
| $Cu_2O$ | 20–39 |

Another family of glasses useful for the beads 15 are some of the various well known graded seal glasses which are generally borosilicate or alumino-borosilicate glasses containing little or no alkali and which may have compositions within the range, by weight, given in the following table:

TABLE II

| | Percent |
|---|---|
| $SiO_2$ | 75–85 |
| $Al_2O_3$ | 1–10 |
| $B_2O_3$ | 8–13 |
| $Na_2O$ | 0–0.8 |
| $K_2O$ | 0–0.5 |
| BaO | 0–3.5 |
| CaO | 0–3.5 |

The following Table III is an analysis of the compositions, in weight percentages, and pertinent physical properties, of three graded seal glasses G1, G2 and G3, a copper-alumino-silicate glass C1, and fused silica or quartz.

TABLE III

| | G1 | G2 | G3 | Cl | Quartz |
|---|---|---|---|---|---|
| $SiO_2$ | 81.98 | 81.95 | 80.54 | 63.3 | 100 |
| $Na_2O$ | .13 | .12 | .77 | | |
| $K_2O$ | .13 | .12 | .10 | | |
| $B_2O_3$ | 11.90 | 12.03 | 12.66 | | |
| $Al_2O_3$ | 5.48 | 5.36 | 1.48 | 13.5 | |
| $Fe_2O_3$ | 0.27 | .032 | .027 | | |
| $Cu_2O$ | | | | 23.2 | |
| Strain Pt., ° C | 691 | 650 | 498 | 520 | 1,070 |
| Anneal Pt., ° C | 767 | 740 | 558 | 570 | 1,140 |
| Softening Pt., ° C | 1,184 | 1,172 | 936 | 750 | 1,670 |
| Expansion Coeff. $\times10^{-7}$ (0–300° C.) | 12.8 | 13.3 | 22.4 | 5 | 5.5 |

The $Na_2O$ in glasses G1 and G2 may be considered as impurities introduced as part of the batch material. The same applies to the $K_2O$ and $Fe_2O_3$ present in the three glasses G1, G2 and G3. It will be noted that the expansion of the copper-alumino-silicate glass C1 is actually slightly less than that of quartz, and the expansion does not vary appreciably over the range of compositions given in Table I.

By way of example, tests were conducted on a halogen cycle lamp of the single-ended type illustrated in the drawing, of 1000 watt rating and having a design life of 500 hours. The beads 15 were of copper-alumino-silicate glass of the composition listed as C1 in Table III, and the lamp was operated with the seal at a temperature of about 450–500° C. The lamp failed due to normal filament burn-out at 411 hours with no hint of foil oxidation. Without the glass beads 15, and based on knowledge accumulated from previous test results, the lamp would have been expected to fail due to seal oxidation at a life ranging from 40 hours to 200 hours.

While certain glass compositions for the beads 15 have been referred to in detail, it will be evident to those skilled in the art that other families of glass compositions may be used provided only that they satisfy the requirements of expansion and softening temperature herein set forth.

What we claim as new and desire to secure by Letters Patent of the United States is:

1. A seal for electrical devices comprising a member of essentially fused silica and a lead-in conductor sealed in and extending through said member, said conductor including a thin foil portion of molybdenum hermetically sealed within said member and subject to oxidation at elevated temperatures above about 350° C., and an outer lead wire portion of refractory metal connected to and extending from said foil portion through said silica member to the exterior thereof with a slight capillary passage extending longitudinally of and between the silica member and the part of said outer lead wire portion enclosed thereby, and a bead of glass bonded directly to said outer lead wire portion and completely embedded in and sealed directly to said member of fused silica and filling the contiguous portion of said capillary passage as an effective barrier to the penetration of air through said passage to said foil, said glass having a coefficient of expansion not substantially greater than about four times that of the fused silica and a softening temperature significantly less than that of the fused silica but above about 700° C.

2. A seal as defined in claim 1 wherein the glass of said bead has a thermal coefficient of expansion not greater than about $23\times10^{-7}$ per degree centigrade.

said bead has a thermal coefficient of expansion less than

3. A seal as defined in claim 1 wherein the glass of about $15\times10^{-7}$ per degree centigrade.

4. A seal as defined in claim 1 wherein the glass of said bead has a softening temperature not greater than about 1300° C.

5. A seal as defined in claim 1 wherein the glass of said bead is a copper-alumino-silicate glass having a composition in the range of, by weight, about 33–66% silica, 11–28% alumina and 20–39% copper oxide.

6. A seal as defined in claim 1 wherein the glass of said bead is a borosilicate glass having a composition in the range of, by weight, about 75–85% $SiO_2$, 1–10% $Al_2O_3$, 8–13% $B_2O_3$, 0–0.8% $Na_2O$, 0–0.5% $K_2O$, 0–3.5% BaO, 0.3.5% CaO.

References Cited

UNITED STATES PATENTS

| | | | |
|---|---|---|---|
| 2,177,685 | 10/1939 | Bol et al. | 174—50.61 |
| 2,844,919 | 7/1958 | Power | 287—189.365 |
| 3,211,826 | 10/1965 | Holcomb et al. | 174—50.64 |

FOREIGN PATENTS

| | | |
|---|---|---|
| 610,933 | 10/1948 | Great Britain. |

EDWARD C. ALLEN, Primary Examiner

U.S. Cl. X.R.

174—50.64